US005964926A

United States Patent [19]
Cohen

[11] Patent Number: 5,964,926
[45] Date of Patent: Oct. 12, 1999

[54] GAS BORN PARTICULATE FILTER AND METHOD OF MAKING

[75] Inventor: Bernard Cohen, Berkeley Lake, Ga.

[73] Assignee: Kimberly-Clark Worldwide, Inc., Neenah, Wis.

[21] Appl. No.: 08/764,102

[22] Filed: Dec. 6, 1996

[51] Int. Cl.$^{6}$ .......... B03C 3/64

[52] U.S. Cl. .......... 96/15; 55/524; 55/528; 55/DIG. 5; 55/DIG. 39; 95/59; 96/66; 96/69; 264/436; 264/484; 264/DIG. 48

[58] Field of Search .......... 96/69, 66, 68, 96/15; 55/524, 528, DIG. 39, DIG. 5; 95/59; 264/435, 436, 484, DIG. 8, DIG. 48; 361/225, 233

[56] References Cited

U.S. PATENT DOCUMENTS

| | | | |
|---|---|---|---|
| 3,995,739 | 12/1976 | Tasch et al. | 206/484 |
| 4,215,682 | 8/1980 | Kubik et al. | 55/DIG. 39 |
| 4,375,718 | 3/1983 | Wadsworth et al. | 264/436 X |
| 4,588,537 | 5/1986 | Klaase et al. | 264/436 |
| 4,592,815 | 6/1986 | Nakao | 264/436 X |
| 5,110,620 | 5/1992 | Tani et al. | 427/538 |
| 5,401,446 | 3/1995 | Tsai et al. | 264/484 |
| 5,830,810 | 11/1998 | Cohen | 55/524 X |
| 5,834,386 | 11/1998 | Cohen | 55/DIG. 39 |

FOREIGN PATENT DOCUMENTS

| | | | |
|---|---|---|---|
| 0 454 104 | 10/1991 | European Pat. Off. . | |
| 1447984 | 6/1966 | France . | |
| 2317354 | 10/1974 | Germany | 96/69 |
| 56-21619 | 2/1981 | Japan | 55/DIG. 39 |
| 1 459 590 | 12/1976 | United Kingdom . | |
| 96/37276 | 11/1996 | WIPO . | |
| 97/21364 | 6/1997 | WIPO . | |

OTHER PUBLICATIONS

U.S. application No. 08/764,103, filed Dec. 6, 1996, Peel Pack Paper.
Copy of PCT Search Report for PCT/US97/22365.
Abstract of Japanese 07 213831 A., Aug. 15, 1995.
Abstract of Japanese 04 305213 A., Oct. 28, 1992.
Abstract of Japanese 06 218211 Aug. 9, 1994.
Abstract for Japanese 05 214655 A., Aug. 24, 1993.
Abstract for FR 1,447,984, Jun. 27, 1966.

*Primary Examiner*—Richard L. Chiesa
*Attorney, Agent, or Firm*—Joseph P. Harps; Nancy M. Klembus

[57] ABSTRACT

Disclosed is an improved filter formed from a non-dielectric material which has been coated with a dielectric material and electret treated by, for example, DC corona discharge treatment. Also disclosed is a method for the formation of the filter.

16 Claims, 1 Drawing Sheet

COAT NON-DIELECTRIC SHEET WITH DIELECTRIC

20

SUBJECT COATED SHEET TO ELECTRET TREATMENT

30

GAS BORN PARTICULATE FILTER AND METHOD OF MAKING

FIELD OF THE INVENTION

The field of the present invention is that of filtration devices adapted to remove particulates from a stream of a gaseous material, such as, for example, air.

BACKGROUND OF THE INVENTION

For decades, if not centuries, mankind has been seeking mechanisms and methods for removing particulates from a flowing stream of gaseous material. The number and type of such filtration devices has generally only been limited by the imagination and creativity of those in the field. Filters, having gained wide acceptance in an extraordinary variety of fields, are under constant evaluation for potential improvement in either their filtration efficiency or their cost or both. Their utility in both industrial, commercial and household applications is beyond question.

A variety of different filtration mechanisms have evolved over the years. For example, mechanical entrapment of particulates entrained within a stream of, for example, air which is being passed through the filter is one well known mechanism. This mechanism, however, is not without its limitations. As the need and desire to remove smaller and smaller particulates with an even increasing higher and higher desired percentage of particulate removal (% efficiency) has grown, it has become apparent that certain limitations exist with mechanical entrapment type filters. Generally speaking, for mechanical entrapment to occur, the pores of the filtration media must be smaller than the particulates which are to be entrapped. Otherwise, the particulates will merely pass through the filter resulting in an undesirable filtration efficiency. Unfortunately, as the pore size of the filtration media is reduced, the ability of the gaseous fluid (air) to pass through the filter is, likewise, reduced. An undesirable side effect is a concomitant reduction in the amount of gaseous material which can pass through the filtration media in a given period of time results. Further, this situation also results in the creation of a significant pressure drop between the two sides of the filter placing the entire filter structure under mechanical duress. In response, stronger filtration media materials have evolved and been utilized. However, removal of very small particulates remained a challenge.

In response to the limitations placed upon the abilities of filters to remove very small particulates, those of skill in the art turned to other mechanisms of particulate removal. One highly satisfactory method was to form the filtration media from a dielectric material. That is, a material which can retain a charge for an extended period of time. The dielectric material of the filter was then subjected to charging as, for example by conventional electreting processes. Exemplary of these processes is a method which applies a charge as a result of the material being subjected to a DC corona discharge treatment. Because the filtration media maintains a charge, it will attract very fine particles having an opposite electrical charge. Further, because the mass of these very fine particulates is so small, the attractive charge is sufficient to retain, that is filter out, the very fine particulates from a stream of air or other gas passing through the filter. Charging a dielectric filter material allowed those of skill in the art to contemplate a range of new possibilities. For example, the pores of the filtration media could be maintained at the smallest possible sized for mechanical entrapment and even smaller particulates would be removed as a result of the charge. Alternatively, the pores of the filtration media could be enlarged to reduced the pressure drop between the two sides of the filter. In such situations filtration efficiencies comparable to filters having smaller pores could be achieved as a result of the additional filtration efficiency of the charged filter material.

Filters made from a dielectric material which had been charged function very well and in most instances, depending upon design, superior to filters which rely solely upon mechanical entrapment. Yet, as is well known, filters relying solely upon mechanical entrapment still flourish. One of the main reasons that filters made from charged dielectric materials have not removed mere mechanical entrapment filters from the marketplace is cost. This cost differential is largely tied up in the cost of the dielectric material as compared to the cost of non-dielectric filtration media.

Accordingly, a need exists in the art for a filtration media which provides both mechanical entrapment and charge entrapment and which is more economical to manufacture than filters made from charged dielectric materials.

OBJECTS OF THE INVENTION

Accordingly, it is a general object of the present invention to provide a filtration device which possesses enhanced ability to remove particulates from a flow of gaseous material such as, for example, from air.

Another object of the present invention is to provide a filtration device which may be economically manufactured.

Yet another object of the present invention is to provide a process for making such improved filtration devices.

A further object of the present invention is to provide an improved filtration device which possesses the ability to prevent passage of particulates through the filtration device as a result of the particulates being attracted to and retained on or within the filtration device as a result of the presence of the electrical charge on/in the filtration device.

Still further objects and the broad scope of applicability of the present invention will become apparent to those of skill in the art from the details given hereinafter. However, it should be understood that the detailed description of the presently preferred embodiment of the present invention is given only by way of illustration because various changes and modifications well within the spirit and scope of the invention will become apparent to those of skill in the art in view of the following description.

DEFINITIONS

As used herein, the term “dielectric material” refers to any material, such as a polymer, which is an electrical insulator or in which an electric field can be sustained with a minimum dissipation of power. A solid material is a dielectric if its valence band is full and is separated from the conduction band by at least 3 eV. This definition is adopted from the McGraw-Hill Encyclopedia of science & Technology, 7th Edition, Copyright 1992.

As used herein, the term “non-dielectric material” refers to any material which is not a dielectric material.

Unless otherwise stated, the filtration effectiveness of a material is measured by a particulate filtration test conventionally known as the NaCl Filter Efficiency Test (hereinafter the NaCl Test). The NaCl Test is conducted using an automatic filter tester, Certitest™ Model # 8110, which is available from TSI Inc., St. Paul, Minn. The particulate filtration efficiency of the tested material is reported as percent (%) penetration. The percent penetration is calculated by the following formula: 100×(downstream particles/upstream particles). The upstream particles represent the total quantity of approximately 0.1 micron NaCl aerosol particles which are introduced into the tester. The downstream particles are those particles which have been introduced into the tester and which have passed through the bulk of the test material. Therefore, the percent penetration value reported is a percentage of the total quantity of particles introduced into a controlled air flow within the tester which pass through the test material. In all cases the face velocity was 31 liters per minute. Unless otherwise stated percent penetration values are the average of three such tests. Naturally, the lower the value is which is returned as a result of this test, the greater the ability of a material to remove particulates from a stream of gaseous material (air) passing through it. That is to say a particulate penetration percent of 25% would equate to a filtration efficiency of 75%.

As used herein, the terminology "electret treatment" or "electreting" refers to any process which places a charge in and/or on a dielectric material. One exemplary process for placing a charge on a dielectric material involves the application of a DC corona discharge to the material. An exemplary conventional method of this type is described in detail in U.S. Pat. No. 5,401,446 to Tsai et al. entitled "Method and Apparatus for the Electrostatic Charging of a Web or Film" which issued on Mar. 28, 1995. The entirety of this patent is hereby incorporated by reference.

As used herein, the term "high density polyethylene" refers to any polyethylene material having a density measured in accordance with ASTM D 2839-93 in the range of from about 0.941 to about 0.959 grams per cubic centimeter.

As used herein, any given range is intended to include any and all lesser included ranges. For example, a range of from 45–90 would also include 50–90; 45–30; 46–89; etc.

SUMMARY OF THE INVENTION

In response to the foregoing challenges which have been experienced by those of skill in the filtration media art, an improved filter for removing particulates from a stream of gaseous material such as air has been invented. In particular, the filter includes a porous sheet of a conventional, non-dielectric filtration material coated with a dielectric material. The thus-coated sheet has been subjected to electrical charging by, for example being electret treated in a conventional manner. As a result of the presence of the coating of dielectric material on the non-dielectric filter material, the sheet is capable of retaining a charge for an extended period of time. In sum, the present invention retains the benefits (superior filtration efficiency) of prior electrically charged filtration media made solely from dielectric material while, at the same time, providing significant cost advantage as compared to such prior electrically charged filtration media.

Desirably, the coating of dielectric material is as thin as practical in order to effect the most cost effective product. In this regard, the coating of dielectric material typically is less than five (5) microns in thickness. For example, the coating of dielectric material may be less than two (2) microns in thickness. More particularly, the coating of dielectric material may be less than one (1) micron in thickness. Even more particularly, the coating of dielectric material may be less than one-half (0.5) micron in thickness.

In some embodiments the filtration media may be charged through the utilization of conventional electret treatment. For example, through the application of a DC corona discharge to the coated filtration media.

In some embodiments, the porous sheet may be selected from the group including apertured films, nonwoven webs, cellulosic sheets, and woven webs.

In some embodiments the dielectric material may be selected from the group including ethylene acrylic acid, copolymers of ethylene acrylic acid, polyolefins, polyolefin copolymers, nylons, and polyesters. If the dielectric material is a polyolefin, it may be a polyethylene such as, for example, a high density polyethylene.

The present invention is also directed toward a method for improving the filtration efficiency of a porous filter material formed from a non-dielectric material. In this regard the method would include the steps of: coating the porous, non-dielectric filter material with a dielectric material; and applying an electrical charge to the coated filter material by, for example, electret treating the coated filter material. One particularly desirable method of electret treatment is the application of a DC corona discharge treatment to the coated filtration material.

In some instances, the coating step may be accomplished by conventional emulsion coating the dielectric material onto the non-dielectric material. Conventional spraying and dip and squeezing techniques may also be utilized.

BRIEF DESCRIPTION OF THE DRAWINGS

The invention is described hereinbelow with reference to FIG. 1, which is a flow chart of an embodiment of the method of the present invention.

DETAILED DESCRIPTION OF THE INVENTION

Figure 1:
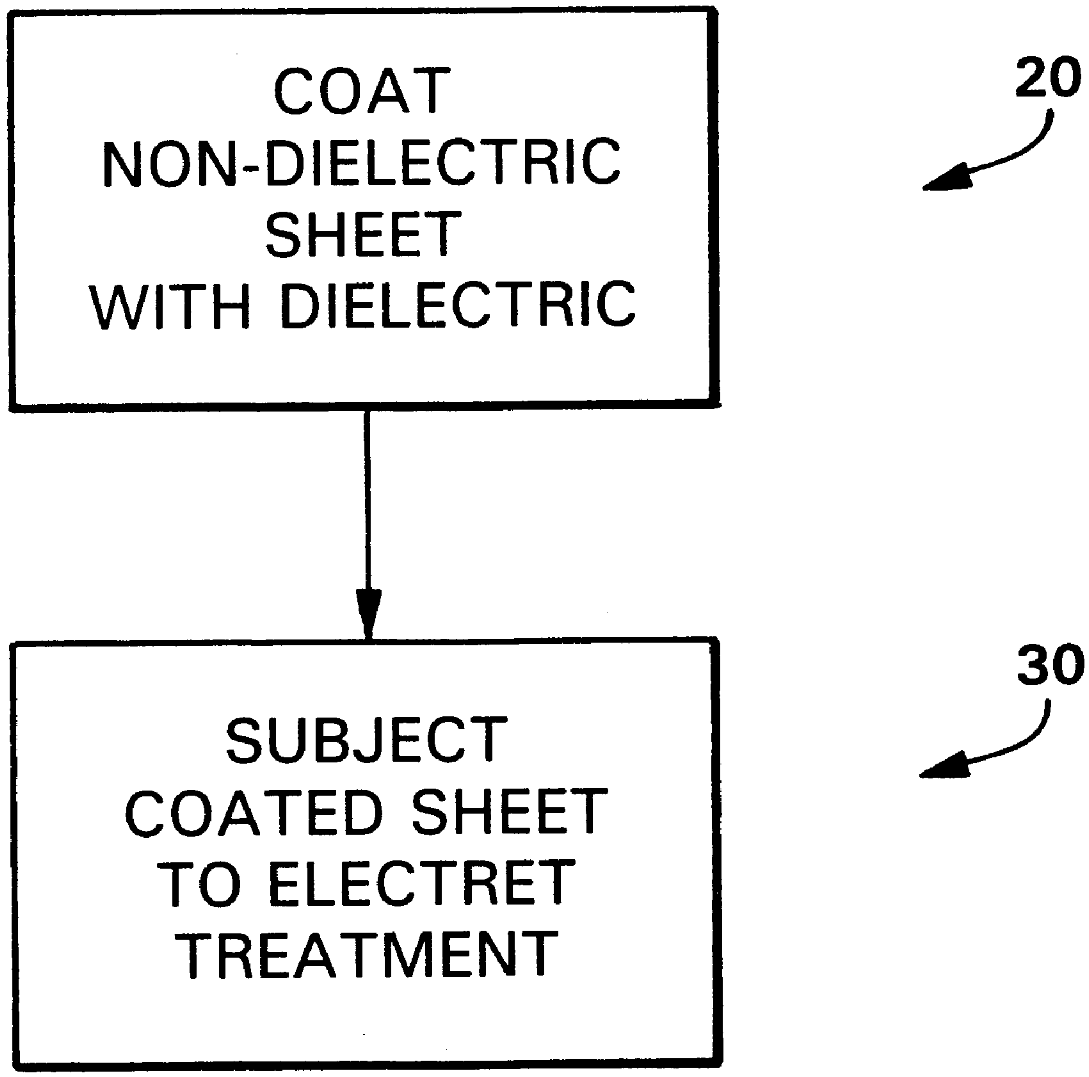

Turning now to the drawings where like reference numerals represent like or equivalent structure or process steps, FIG. 1 is a schematic representation of the process for forming the improved filtration media in accordance with the teachings of the present invention. The process is initiated at step 10 with the provision of a sheet of conventional non-dielectric filtration material. The sheet may be, for example, an apertured film, an nonwoven web, a cellulosic sheet or a woven web.

Thereafter, the sheet of conventional non-dielectric filtration material is coated at step 20 with a dielectric material. In some embodiments, the coating can be accomplished through use of conventional emulsion coating techniques. For example, the emulsion coating can be accomplished by passing the sheet of filtration material through a nip formed by nip rollers with the nip being flooded by the dielectric emulsion. Those of skill in the art will readily recognize that the amount of dielectric emulsion applied to the paper can be easily and readily varied by condensing or diluting the emulsion. Additionally, this amount can be easily increased by passing the sheet of filtration material through the flooded nip two or more times since, with each passage, the sheet tends to pick up more dielectric material. The amount of material picked up and retained by the sheet (add-on) will vary with the application in which the filtration material is to be used. However, generally speaking it is desirable for the amount of add-on to be in the range of about 10–100%, by weight, of the sheet. For example the amount of dielectric add-on may vary within the range of from 20–80%, by weight, of the sheet. More particularly, the amount of dielectric add-on may vary within the range of from 40–60%, by weight, of the sheet.

The emulsion coating processes is carried out, in conventional fashion, so that substantially the entire surface of the sheet is coated with the dielectric material. In the instance where the sheet is a fibrous web (nonwoven or otherwise) substantially all of the fibers of the web are coated with the dielectric material. Desirably, the coating of dielectric material is as thin as practical in order to effect the most cost effective product. In this regard, the coating of dielectric material typically is less than five (5) microns in thickness. For example, the coating of dielectric material may be less than two (2) microns in thickness. More particularly, the coating of dielectric material may be less than one (1) micron in thickness. Even more particularly, the coating of dielectric material may be less than one-half (0.5) micron in thickness. Naturally, thicker coatings could be utilized. However, one of the purposes of the present invention is to minimize utilization of the dielectric material so that overall cost of the filtration material may be minimized.

In some embodiments the dielectric material may be selected from the group including ethylene acrylic acid, copolymers of ethylene acrylic acid, polyolefins, polyolefin copolymers, nylons, and polyesters. If the dielectric material is a polyolefin, it may be a polyethylene such as, for example, a high density polyethylene. One particular dielectric emulsion coating may be obtained under the trade designation Michem Emulsion 93135 (Michelman Inc., Cincinnati, Ohio). Michelman information states that Michem 93135 is a high density polyethylene emulsion which is a tan colored translucent liquid having a pH of 10.0–11.5 and a specific gravity of 0.99–1.01. Another desirable dielectric coating material may also be obtained from Michelman, Inc. under the trade designation Michem Prime 4983. Michelman information states that Michem 4983 is a dispersion of ethylene acrylic acid which is a translucent liquid having a pH of 8.3–10.

FIG. 1 further illustrates, at step 30, that the dielectric coated sheet of conventional filtration media is subjected to electreting in order to instill a charge on the dielectric coating. Electreting may be accomplished by, for example, application of a DC corona charge (DC corona discharge treatment) in a conventional manner. The method described in U.S. Pat. No. 5,401,446 is a conventional method for DC corona discharge treatment. The contents of this patent are hereby incorporated by reference.

The invention will now be described in more detail with reference to specific examples and embodiments. However, in no way should the invention be taken to be limited to the specific examples disclosed and discussed below.

EXAMPLE 1

A porous non-dielectric material, white vacuum cleaner bag paper, obtained from the Kimberly-Clark Corporation of Dallas, Texas, under the trade designation BP332 was emulsion coated with a dielectric polyethylene (Michem 93135). The emulsion was coated onto the vacuum cleaner bag paper by flooding a nip formed by two nip rollers and passing the vacuum cleaner bag paper through the flooded nip. In this example one of the nip rolls was hard rubber and the other was steel. The amount of dielectric material coated onto the vacuum cleaner bag paper was measured as a percent of the dry weight of the paper. That is, the paper is weighed before its emulsion coating and after the coating. The percent add-on is the weight of the amount of dielectric material added to the paper divided by the uncoated weight of the paper. Those of skill in the art will recognize that the amount of add-on can be varied by (a) condensing or diluting the emulsion, and/or (b) passing the paper through the flooded nip more than one time. In this example different samples of the paper were passed through the flooded nip to achieve two different percentages, by weight, of add-on of dielectric polyethylene (12.6% and 25.0%). Some samples were not emulsion coated, to serve for comparison testing. Percent add-on in all cases was determined from the formula:

$$\frac{\text{coated weight} - \text{uncoated weight}}{\text{uncoated weight}} \times 100 = \%\ \text{add on}$$

After air drying, the filtration capabilities of the paper at three levels of add-on (0%, 12.6% and 25.0%), were determined through the use of NaCl particulate penetration testing in accordance with the test parameters herein stated. An Automatic Filter Tester, Model 8110, from TSI Inc., of St. Paul, Minn., was the equipment used in the determination of the NaCl particulate penetration.

Thereafter, samples of the three levels of dielectric add-on (0%, 12.6% and 25.0%) were electret treated by the application of a DC corona discharge treatment. The corona discharge was produced by using a Model No. P/N 25A—120 volt, 50/60 Hz reversible polarity power unit (Simco Corp., Hatfield, Pa.), which was connected to a RC-3 Charge Master charge bar (Simco Corp.), and a Model No. P16v 120 volt, 25 A 50/60 Hz power unit (Simco Corp.) which was connected to a solid, three inch diameter, aluminum roller. The corona discharge environment was 70 degrees F. and 71.2% relative humidity. As described in U.S. Pat. No. 5,401,446, two sets of charge bars/rollers were used. The voltage applied to the first charge bar/roller set was −13 Kv/0 Kv, respectively. The voltage applied to the second charge bar/roller set was −19 Kv/0 Kv, respectively.

The filtration capabilities of the three levels of add-on after electret treatment were also determined, in like manner as above, through the use of the Automatic Filter Tester, Model 8110.

The results of these experiments are recorded in Table I.

TABLE I

| Percent Add-On | Electret | Percent Penetration (0.1 micron NaCl) |
|---|---|---|
| 0.0 | No | 80.9 |
| 0.0 | Yes | 79.9 |
| 12.6 | No | 79.0 |
| 12.6 | Yes | 72.0 |
| 25.0 | No | 70.5 |
| 25.0 | Yes | 61.5 |

These results are the average of two samples. Face velocity at 0% add-on was about 31 liters per minute and the pressure drop was about 8 millimeters of water. At 12.6% add-on the face velocity was about 31 liters per minute and the pressure drop varied between 11 and 15 millimeters of water. At 25.0% add-on the face velocity was about 31 liters per minute and the pressure drop varied between 20 and 22 millimeters of water.

Table I demonstrates, in all cases, improvement in the ability of the electret treated, dielectric coated vacuum cleaner paper to remove particulates from gaseous material (air) passing through it.

EXAMPLE 2

A second porous non-dielectric material, cheese cloth (Grade 90) made from 100% cotton, which may be obtained from the American Fiber & Finishing Inc., of Burlington Mass. was emulsion coated with a dielectric ethylene acrylic acid (Michem 4983). The emulsion was coated onto the cheese cloth by flooding a nip formed by two nip rollers and passing the cheese cloth through the flooded nip. In this example one of the nip rolls was hard rubber and the other was steel. The amount of dielectric material coated onto the cheese cloth was measured as a percent of the dry weight of the cloth. That is, the cloth is weighed before its emulsion coating and after the coating. The percent add-on is the weight of the amount of dielectric material added to the cloth divided by the uncoated weight of the cloth. In this example different samples of the cloth were passed through the flooded nip to achieve two different percentages, by weight, of add-on of dielectric polyethylene (47.1% and 50.5%). Some samples were not emulsion coated, to serve for comparison testing. Percent add-on in all cases was determined from the formula:

$$\frac{\text{coated weight} - \text{uncoated weight}}{\text{uncoated weight}} \times 100 = \%\ \text{add on}$$

After air drying, the filtration capabilities of the cloth at three levels of add-on (0%, 47.1% and 50.5%), were determined through the use of NaCl particulate penetration testing in accordance with the test parameters herein stated. An Automatic Filter Tester, Model 8110, from TSI Inc., of St. Paul, Minn., was the equipment used in the determination of the NaCl particulate penetration.

Thereafter, samples of the three levels of dielectric add-on (0%, 47.1% and 50.5%) were electret treated by the application of a DC corona discharge treatment. The corona discharge was produced by using a Model No. P/N 25A—120 volt, 50/60 Hz reversible polarity power unit (Simco Corp., Hatfield, Pa.), which was connected to a RC-3 Charge Master charge bar (Simco Corp.), and a Model No. P16v 120 volt,. 25 A 50/60 Hz power unit (Simco Corp.) which was connected to a solid, three inch diameter, aluminum roller. The corona discharge environment was 70.6 degrees F. and 28% relative humidity. As described in U.S. Pat. No. 5,401, 446, two sets of charge bars/rollers were used. The voltage applied to the first charge bar/roller set was −12 Kv/0.0 Kv, respectively. The voltage applied to the second charge bar/roller set was −12 Kv/0.0 Kv, respectively.

The filtration capabilities of the three levels of add-on after electret treatment were also determined, in like manner as above, through the use of the Automatic Filter Tester, Model 8110.

The results of these experiments are recorded in Table II.

TABLE II

| Percent Add-On | Electret | Percent Penetration (0.1 micron NaCl) |
|---|---|---|
| 0.0 | No | 100.1 |
| 0.0 | Yes | 100.6 |
| 47.1 | No | 100.0 |
| 47.1 | Yes | 97.7 |
| 50.5 | No | 100.4 |
| 50.5 | Yes | 97.5 |

These results are the average of three samples. Face velocity at 0% add-on was about 32 liters per minute and the pressure drop was about 0.0 millimeters of water. At 47.1% add-on the face velocity was about 31 liters per minute and the pressure drop was about 0.0 millimeters of water. At 50.5% add-on the face velocity was about 31 liters per minute and the pressure drop was about 0.0 millimeters of water.

This cheese cloth material was quite open in structure (holes greater than 400×300 microns) as indicated by the fact that it essentially had zero ability to remove particulates from air passing through it, both before and after the emulsion coating step. (Note penetration values of 100% or greater indicate zero ability to remove particulates.) In spite of this fact, Table II demonstrates, in all cases, consistent improvement, albeit slight (about 2.5%), in the ability of the electret treated, dielectric coated, cloth to remove particulates from gaseous material (air) passing through it. While the improvement is characterized as "slight", in a mathematical sense, those of skill in the art will readily recognize that the ability of a highly porous structure having pores in the 400×300 micron range, to interdict any 0.1 micron particles is quite significant. Substantially all of these particles would be expected to pass through this material.

EXAMPLE 3

A third porous non-dielectric material, fiberglass for use in the repair of boat hulls, was emulsion coated with a dielectric ethylene acrylic acid (Michem 4983). The fiberglass had a basis weight of about 13.5 ounces per square yard and can be obtained from the Fiberglass Evercoat Co., Inc., of Cincinnati, Ohio, under the trade designation Evercoat #94D Sea-Glass Fiberglass Mat. The emulsion was coated onto the fiberglass by flooding a nip formed by two nip rollers and passing the fiberglass sheet through the flooded nip. In this example one of the nip rolls was hard rubber and the other was steel. The amount of dielectric material coated onto the fiberglass sheet was measured as a percent of the dry weight of the sheet. That is, the fiberglass sheet is weighed before its emulsion coating and after the coating. The percent add-on is the weight of the sheet after the addition of the dielectric material minus the weight of the uncoated sheet divided by the uncoated weight of the sheet. In this example different samples of the fiberglass were passed through the flooded nip to achieve two different percentages, by weight, of add-on of dielectric ethylene acrylic acid (18.8% and 21.4%). Some samples were not emulsion coated, to serve for comparison testing. Percent add-on in all cases was determined from the formula:

$$\frac{\text{coated weight} - \text{uncoated weight}}{\text{uncoated weight}} \times 100 = \%\ \text{add on}$$

After air drying, the filtration capabilities of the fiberglass at three levels of add-on (0%, 18.8% and 21.4%), were determined through the use of NaCl particulate penetration testing in accordance with the test parameters herein stated. An Automatic Filter Tester, Model 8110, from TSI Inc., of St. Paul, Minn., was the equipment used in the determination of the NaCl particulate penetration.

Thereafter, samples of the three levels of dielectric add-on (0%, 18.8% and 21.4%) were electret treated by the application of a DC corona discharge treatment. The corona discharge was produced by using a Model No. P/N 25A—120 volt, 50/60 Hz reversible polarity power unit (Simco Corp., Hatfield, Pa.), which was connected to a RC-3 Charge Master charge bar (Simco Corp.), and a Model No. P16v 120 volt,. 25 A 50/60 Hz power unit (Simco Corp.) which was connected to a solid, three inch diameter, aluminum roller. The corona discharge environment was 70.6 degrees F. and 28% relative humidity. As described in U.S. Pat. No. 5,401, 446, two sets of charge bars/rollers were used. The voltage applied to the first charge bar/roller set was −12 Kv/0.0 Kv, respectively. The voltage applied to the second charge bar/roller set was −12 Kv/0.0 Kv, respectively.

The filtration capabilities of the three levels of add-on after electret treatment were also determined, in like manner as above, through the use of the Automatic Filter Tester, Model 8110.

The results of these experiments are recorded in Table III.

TABLE III

| Percent Add-On | Electret | Percent Penetration (0.1 micron NaCl) |
|---|---|---|
| 0.0 | No | –1 |
| 0.0 | Yes | –1 |
| 18.8 | No | 95.3 |
| 18.8 | Yes | 89.3 |
| 21.4 | No | 95.7 |
| 21.4 | Yes | 87.1 |

1. Note that measurements for the uncoated fiberglass were not possible to obtain due to the instability of the sheet. That is, the porous fiberglass sheet which is formed from pressing material together, would come apart when an attempt was made to pass air through it carrying material through the detector giving erroneous results. For the samples with add-on the dielectric coating stabilized the sheet sufficiently to obtain proper readings.

These results are the average of three samples. Face velocity at 18.8% add-on was about 31 liters per minute and the pressure drop was about 0.8 millimeters of water. At 21.4% add-on the face velocity was about 31 liters per minute and the pressure drop was about 1.0 millimeters of water.

The fiberglass material is composed of pieces of fiberglass about 2 inches long and about 1/32 of an inch wide. Even though the material is compressed into a mat, it sheds easily. It has the appearance of a tight structure but with a lot of very visible holes which appear to range upward to about 700 square microns in size. Table III demonstrates, in all cases, consistent improvement in the ability of the dielectric coated, electret treated porous fiberglass to remove particulates from gaseous material (air) passing through it. As was previously stated, the ability of a porous material having pores in the range of 700 square microns to remove any 0.1 micron particles is quite significant. Those of skill in the art will readily recognize that the width of the pores of the fiberglass material ranged upwards of 7,000 times as large as the 0.1 particles.

In summary, the data demonstrate the fact that porous non-dielectric materials may be coated with dielectric materials and subsequently charged as by, for example, electret treatment through application of a DC corona discharge treatment. The thus coated and treated materials consistently exhibit improved ability to remove particulate materials from a gaseous material such as air passing through it.

While the invention has been described in detail with respect to specific preferred embodiments thereof, it will be appreciated that those skilled in the art, upon attaining an understanding of the foregoing, may readily conceive of alterations to and variations of the preferred embodiments. Such alterations and variations are believed to fall within the scope and spirit of the invention and the appended claims.

What is claimed is:

1. A filter adapted to remove particulate material from a gaseous material passing through the filter, the filter comprising:

a porous sheet of a non-dielectric material coated with a dielectric material, and wherein the coated sheet has been electret treated to establish a charge on the dielectric material.

2. The filter according to claim 1, wherein the electret treatment comprises application of a DC corona charge.

3. The filter according to claim 1, wherein the porous sheet is selected from the group consisting of apertured films, nonwoven webs, cellulosic sheets, and woven webs.

4. The filter according to claim 1, wherein the dielectric material is selected from the group consisting of ethylene acrylic acid, copolymers of ethylene acrylic acid, polyolefins, polyolefin copolymers, nylons, and polyesters.

5. The filter according to claim 1, wherein the dielectric coating has a thickness of less than 5 microns.

6. The filter according to claim 1, wherein the dielectric coating has a thickness of less than 2 microns.

7. The filter according to claim 1, wherein the dielectric coating has a thickness of less than 1 micron.

8. The filter according to claim 1, wherein the dielectric coating has a thickness of less than 0.5 micron.

9. A method for improving the filtration efficiency of a porous filter material formed from a non-dielectric material, the improvement comprising the steps of:

coating the porous, non-dielectric filter material with a dielectric material, and electret treating the coated filter material to establish a charge on the dielectric material.

10. The method according to claim 9, wherein the coating step is accomplished by emulsion coating the dielectric material onto the non-dielectric material.

11. The method according to claim 9, wherein the step of electret treating the coated filter material includes applying a DC corona discharge treatment to the coated filter material.

12. The method according to claim 9, wherein the non-dielectric material is selected from the group consisting of apertured films, non-woven webs, cellulosic sheets and woven webs.

13. The method according to claim 9, wherein the dielectric material is selected from the group consisting of ethylene acrylic acid, copolymers of ethylene acrylic acid, polyolefins, polyolefin copolymers, nylons, and polyesters.

14. A filter adapted to remove particulate material from a gaseous material passing through the filter, the filter comprising:

a porous sheet of a non-dielectric material coated with a dielectric material, and wherein the coated sheet has been subjected to a DC corona discharge treatment to establish a charge on the dielectric material.

15. The filter according to claim 14, wherein the porous sheet is selected from the group consisting of apertured films, nonwoven webs, cellulosic sheets, and woven webs.

16. The filter according to claim 14, wherein the dielectric material is selected from the group consisting of ethylene acrylic acid, copolymers of ethylene acrylic acid, polyolefins, polyolefin copolymers, nylons, and polyesters.

* * * * *